United States Patent [19]
Dimino et al.

[11] Patent Number: 5,729,450
[45] Date of Patent: Mar. 17, 1998

[54] POWER CONVERTER WITH RIPPLE CURRENT AND BULK FILTERING SUPPLIED BY HIGH-CURRENT, HIGH-MICROFARAD FILM CAPACITOR ARRANGEMENT

[75] Inventors: Christopher A. Dimino, New Berlin; James A. Pomes, Shorewood, both of Wis.

[73] Assignee: MagneTek, Inc., Nashville, Tenn.

[21] Appl. No.: 490,409

[22] Filed: Jun. 14, 1995

[51] Int. Cl.$^6$ ............................................. H02M 7/5387
[52] U.S. Cl. ............................................. 363/132; 363/39
[58] Field of Search ............................. 363/95, 97, 98, 363/131, 132, 17, 135, 136, 141, 39

[56] References Cited

U.S. PATENT DOCUMENTS 5,453,665  9/1995  Konopka ................................. 315/219

*Primary Examiner*—Peter S. Wong
*Assistant Examiner*—Y. J. Han
*Attorney, Agent, or Firm*—Seldon & Scillieri

[57] ABSTRACT

In a power inverter, ripple current and bulk filtering are provided by a high-current, high-microfarad film capacitor arrangement; there is no separate snubber capacitor section. In an alternative embodiment, a small high-frequency film capacitor is connected in parallel with the bulk film capacitor arrangement, thereby increasing the operating range of the circuit.

4 Claims, 10 Drawing Sheets

POWER CONVERTER WITH RIPPLE CURRENT AND BULK FILTERING SUPPLIED BY HIGH-CURRENT, HIGH-MICROFARAD FILM CAPACITOR ARRANGEMENT

BACKGROUND OF THE INVENTION

1. Technical Field

The present invention relates generally to the field of power conversion equipment, and in particular to bulk capacitors used in power conversion equipment.

2. Background Art

Power conversion equipment requires the high-speed switching of large currents by power electronic semiconductor devices, such as insulated gate bipolar transistors (IGBTs). Typically, in prior-art power converter circuits, ripple current is supplied by a bank of bulk capacitors. In addition to supplying the ripple current, the bank of bulk capacitors must also act as a filter to attenuate the voltages produced by the ripple current. This function imposes a minimum microfarad requirement for the bank of bulk capacitors.

The functions of supplying ripple current and bulk filtering are very different. In prior art power converter circuits, electrolytic capacitors are used to make up the bank of bulk capacitors, as electrolytic capacitors have the characteristics needed to provide the proper balance of ripple current capacity and capacitance to satisfy the dominant frequency and filter requirements. The number of electrolytic capacitors chosen is a function of these parameters.

Further, a power converter circuit must provide protection of circuit components from overvoltages arising from repetitive transient voltages, i.e., spikes, arising from the high switching speeds of the power devices in the inverter circuit. In the prior art, the voltage transients, or spikes, are contained by the use of a separate snubber network that typically uses high-frequency film or ceramic capacitor technology. At lower operating voltages, the snubbing function can be performed by high-frequency capacitors alone. Power inverter circuits that operate at higher voltages may include a complex diode clamp circuit to perform the snubbing function.

One typical prior-art power inverter circuit includes a bank of ten electrolytic capacitors for ripple current supply and bulk filtering, and three additional snubber capacitors to protect the switching transistors. The bank of electrolytic capacitors and the snubber capacitors are interconnected with each other and with the switching transistors by means of a complex bus bar assembly.

The prior art capacitor arrangement has several known disadvantages. First, the electrolytic capacitor dielectric can dry out over time, resulting in a small explosion at the end of the capacitor's life. In many power conversion systems, the lifetime of the product is dominated by the electrolytics used in the design. Often, many more capacitors are used than needed to provide the required capacitance, in order to extend product life. Further, because of the number of capacitors and the complexity of the bus bar assembly, the installation of these components takes up a significant portion of the amount of time required to manufacture the circuit. Finally, the bank of electrolytic capacitors and the snubber capacitor section occupy a substantial amount of space, and represent a significant part of the overall volume occupied by the circuit.

SUMMARY OF THE INVENTION

These and other disadvantages of the prior art are overcome by the present invention. In a preferred embodiment of a power inverter circuit according to the present invention, the ripple current and bulk filtering are provided by a high-current, high-microfarad film capacitor arrangement; the snubber capacitor section is eliminated entirely. According to a further preferred embodiment of the present invention, a small high-frequency film capacitor is connected in parallel with the bulk film capacitor arrangement, thereby increasing the operating range of the circuit.

DESCRIPTION OF SPECIFIC EMBODIMENTS

Figure 1:
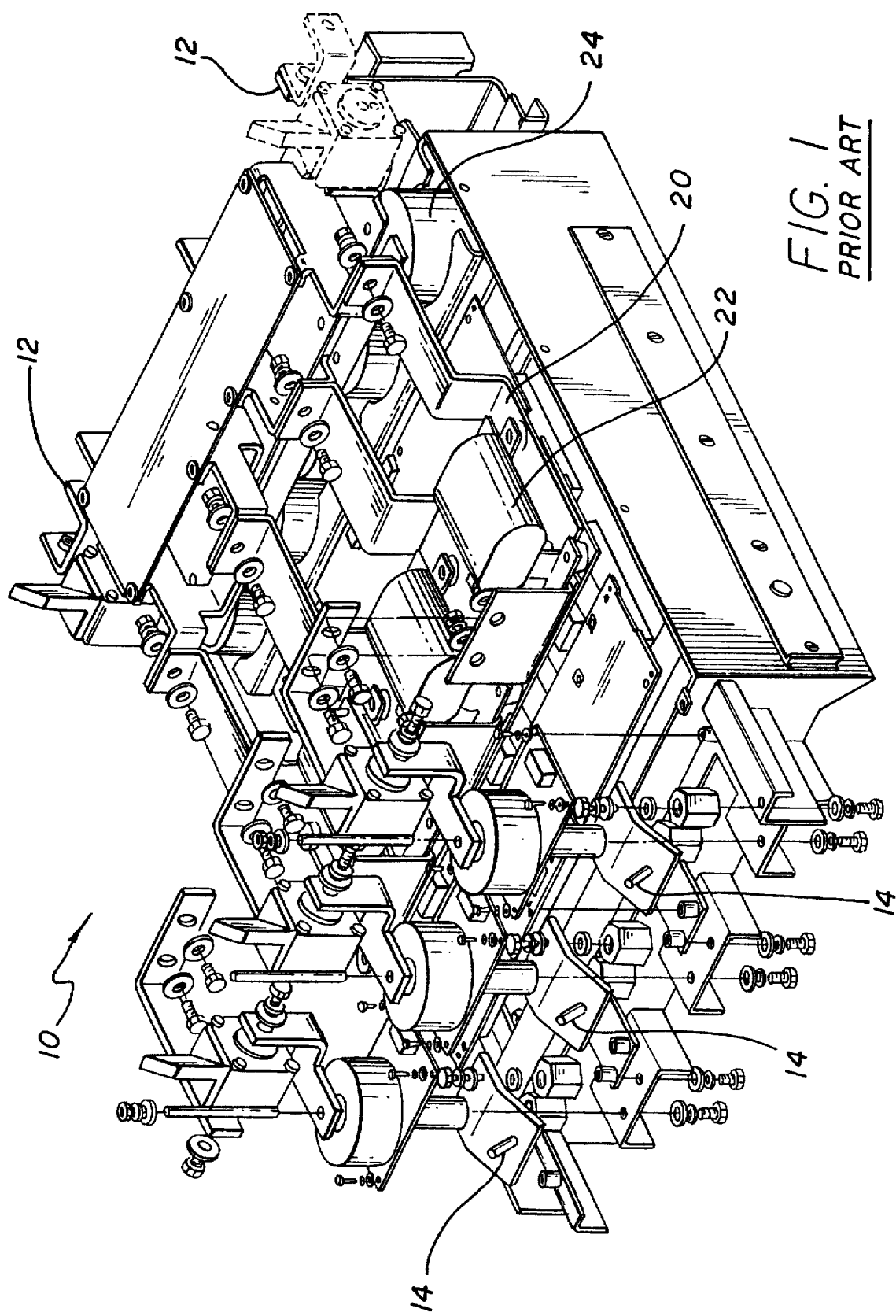
FIGS. 1 shows a perspective view of a power inverter according to the prior art.

FIG. 1 shows a perspective view of a power inverter 10 according to the prior art. The inverter 10 receives as an input at a pair of terminals 12 a DC voltage from a power supply. In this case, the DC power supply is generated by a fuel cell. The inverter circuit converts the DC input into three-phase alternating current, which is fed into a utility grid from three output terminals 14.

Figure 2:
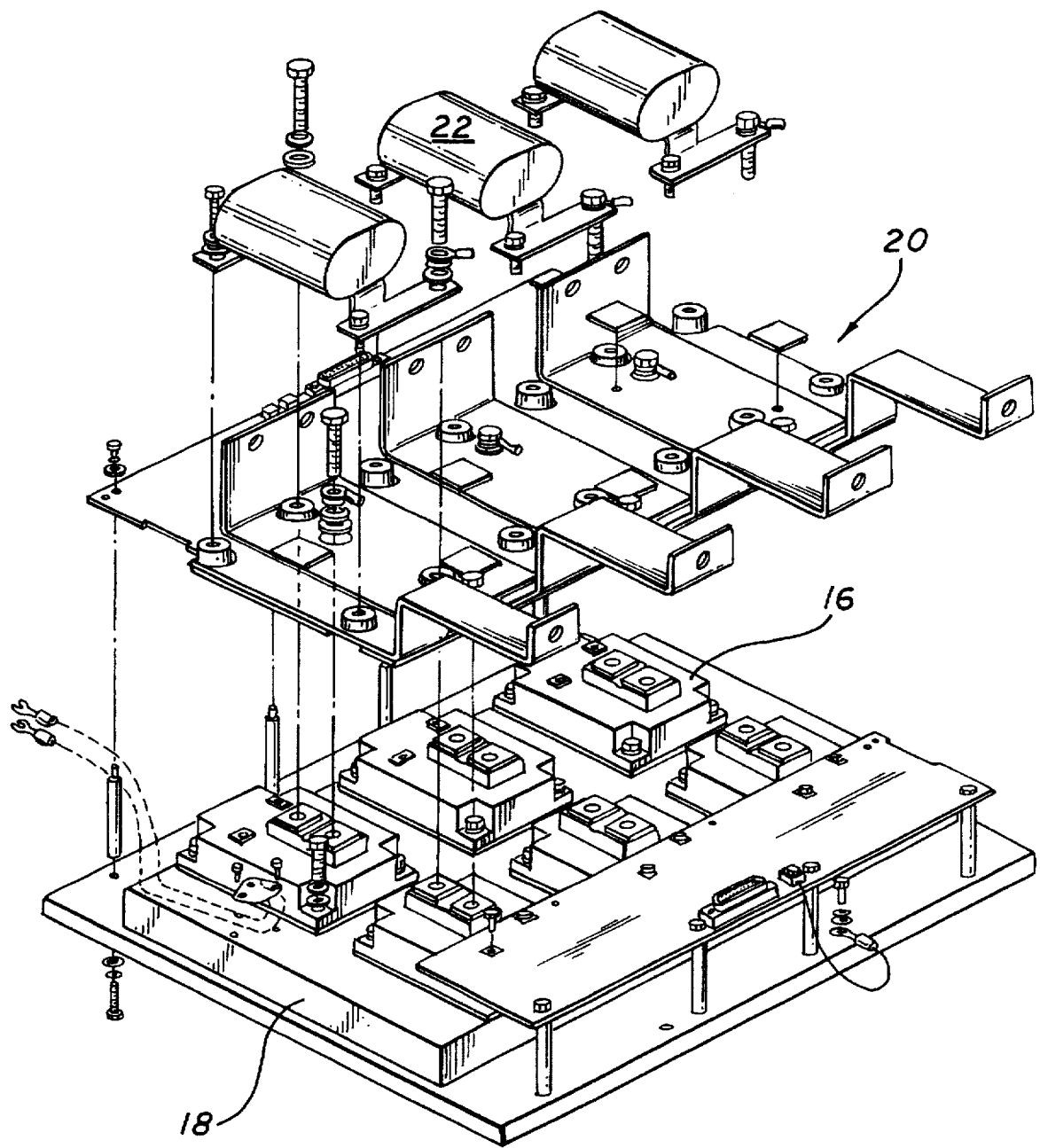
FIGS. 2 and 3 show exploded perspective views of portions of the power inverter shown in FIG. 1
Figure 3:
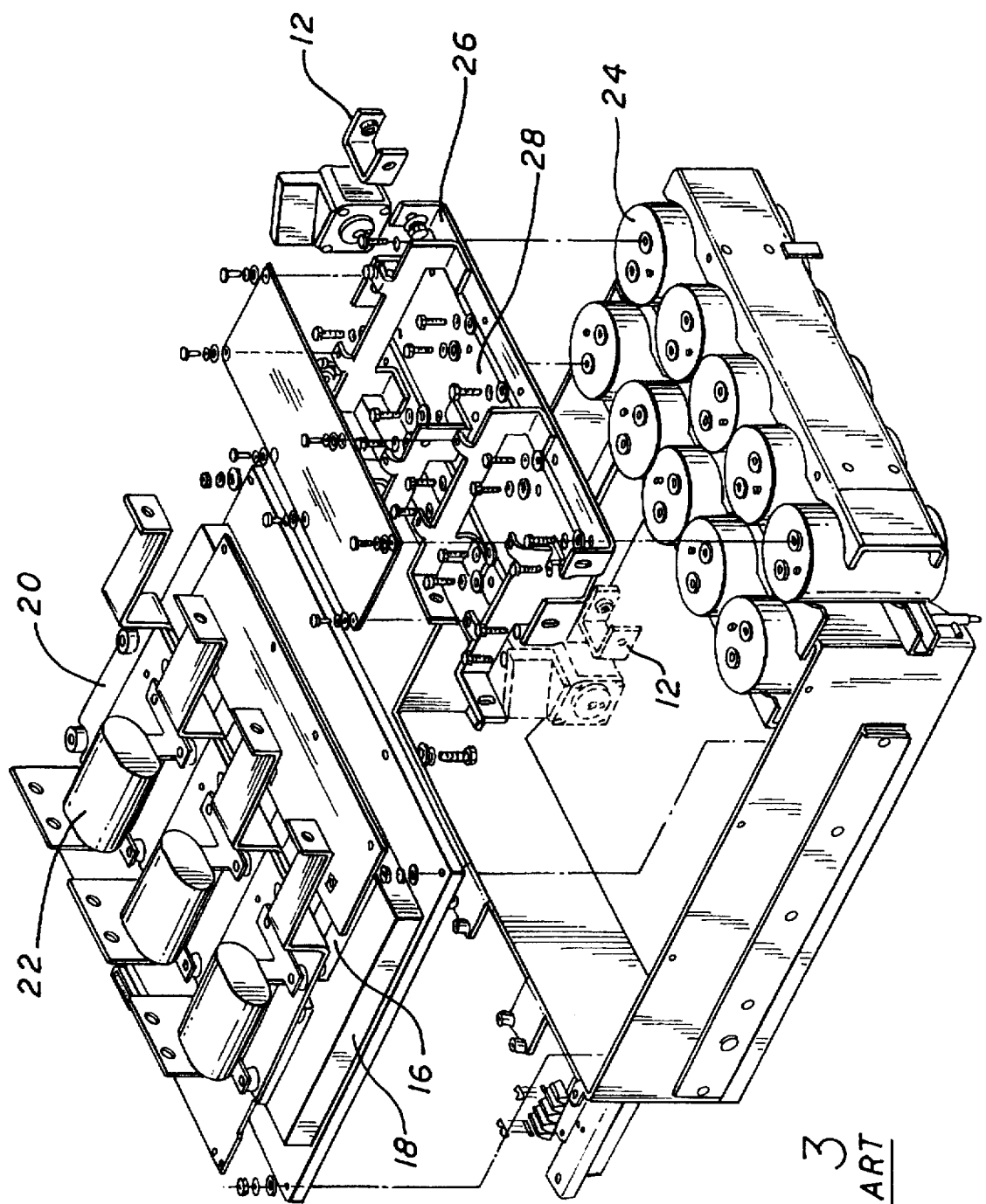

The construction of the FIG. 1 circuit can be better understood with reference to FIGS. 2 and 3. FIG. 2 shows an exploded perspective view of the heart of the inverter circuit, which includes six insulated-gate bipolar transistors (IGBTs) 16 mounted onto a water-cooled plate 18, in a 3×2 matrix. A bus bar assembly 20 is bolted to the device terminals of the IGBTs. Three snubber capacitors 22 are bolted to the bus bar assembly. The purpose of these snubber capacitors is to protect the IGBTs from repetitive transient voltages arising during the normal course of operation of the inverter. In other prior art power inverter circuits, particularly those operating at higher voltages, the snubbing function is performed by a complex diode clamp circuit.

As shown in FIG. 3, after IGBTs 16, bus bar assembly 20, and snubber capacitors 22 are bolted together, they are then assembled with a bank of ten electrolytic capacitors 24 (30 ripple amps per can, 5500 μF each), which supply ripple current to the circuit, and which also provide bulk filtering to attenuate the voltages from the ripple current. The quantity of microfarads provided by the electrolytic capacitors is due to the ripple current requirement; however, the application does not require this much capacitance. The ten electrolytic capacitors 24 are interconnected by means of bus bars 26 and 28, which also connect the electrolytic capacitors 24 to the IGBTs 16 and snubber capacitors 22.

Figure 4:
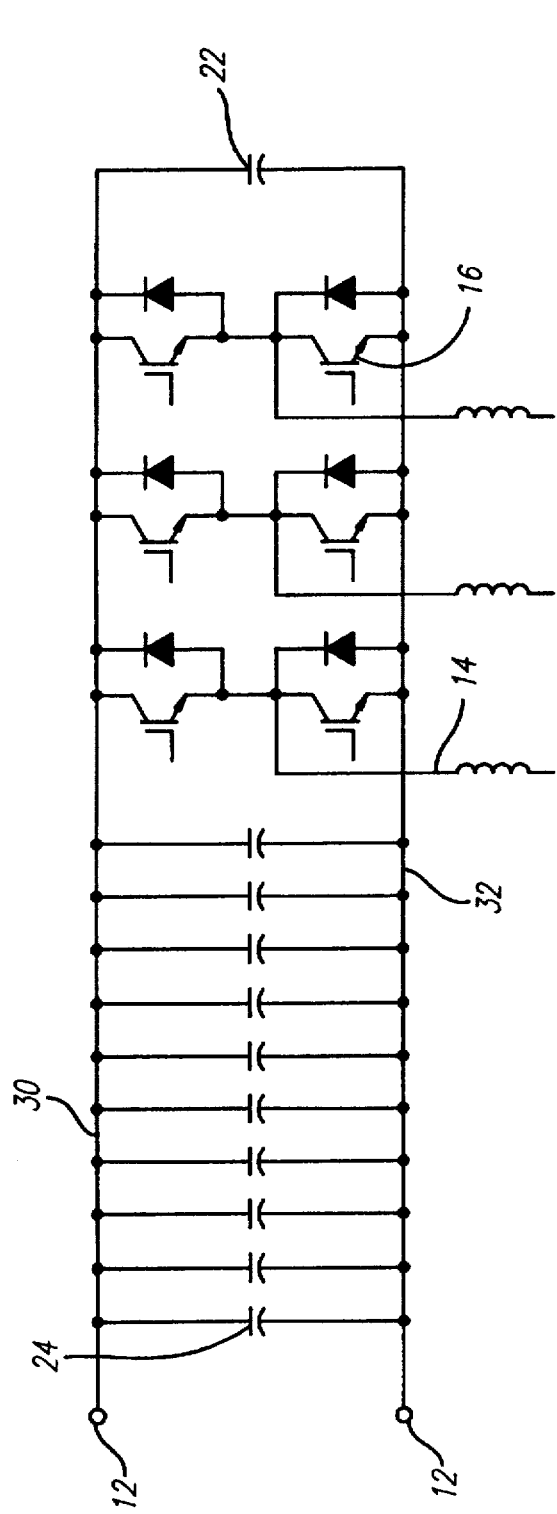
FIG. 4 shows a circuit diagram of the inverter shown in FIGS. 1–3.

FIG. 4 is a circuit diagram of the inverter shown in FIGS. 1-3. In FIG. 4, the bus assemblies are collectively represented as first and second conductors 30, 32, which receive the DC input at a pair of input terminals 12. The six IGBTs 16 are divided into three pairs, corresponding to the 3×2 matrix shown in FIG. 2, each pair of IGBTs being series-connected across the first and second conductors 30, 32, with each output terminal 14 connected to a node along the series connection between its respective pair of switching transistors 16. The bank of ten electrolytic filtering capacitors 24 is shown at the left of FIG. 4, and the snubber capacitor section is represented by a single capacitor 22 at the right.

Figure 5A:
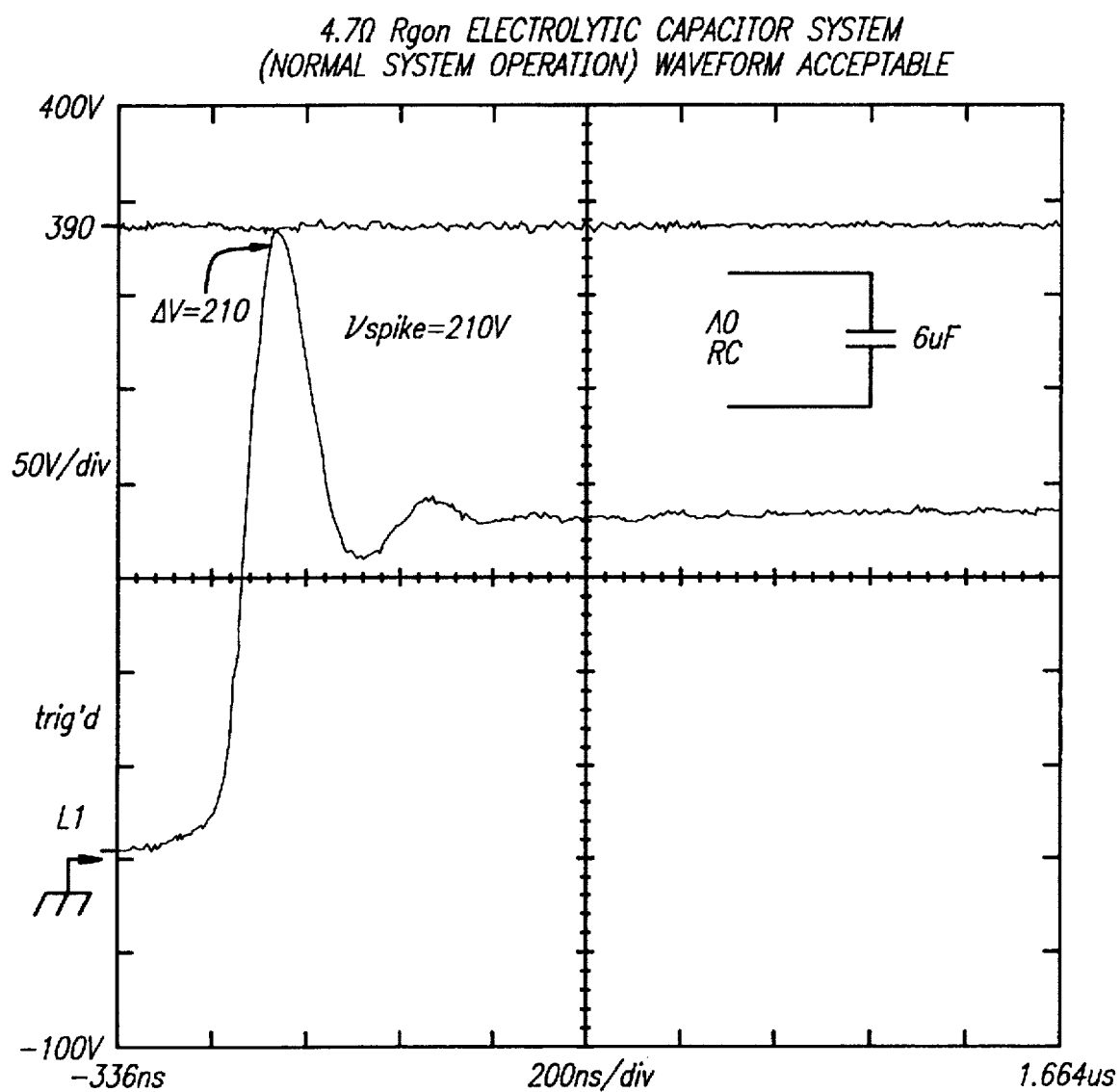
FIGS. 5A and 5B show oscilloscope plots taken from the inverter circuit shown in FIGS. 1–4.
Figure 5B:
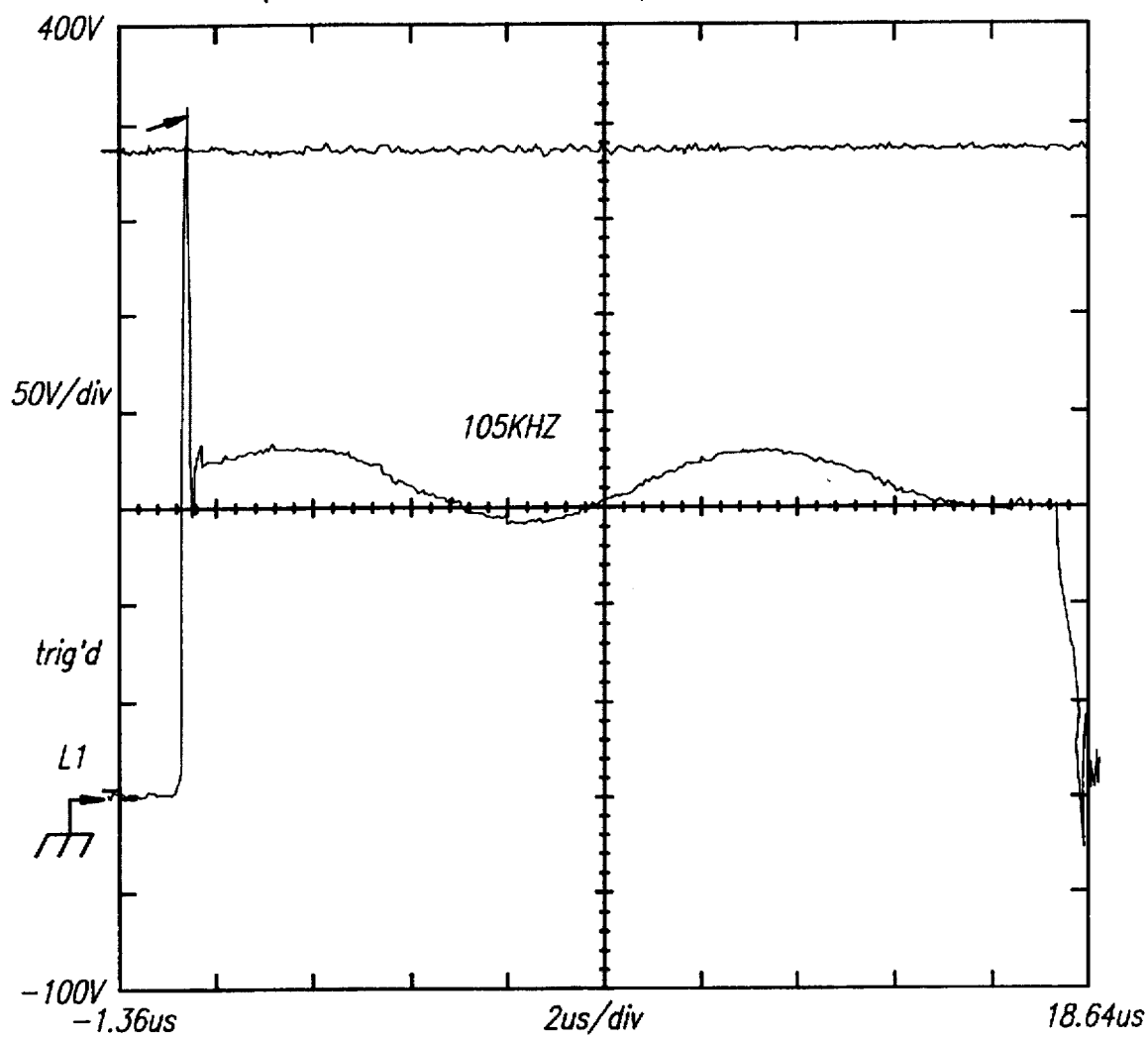

FIGS. 5A and 5B show oscilloscope plots taken from the inverter circuit shown in FIGS. 1-4, illustrating the voltage across one of the six IGBTs as it switches off. The waveforms shown in FIGS. 5A and 5B are the same; in FIG. 5A, the initial spike is shown with an expanded time scale. At the start of the plot, the IGBT is on; thus, the voltage across it is zero. When the IGBT turns off, the voltage across the IGBT rises in a spike and then settles back to the DC bus voltage. The voltage spike is within the acceptable operating range for the IGBT.

As set forth above in the discussion of the background art, and as is apparent from FIGS. 1-4, the prior art suffers from numerous disadvantages. The bank of electrolytic capacitors, the snubber capacitors, and the bus bar assemblies in the inverter shown in FIGS. 1-4 represent a relatively large number of components, occupying a significant amount of space, and requiring a significant amount of time for assembly. Further, as discussed above, electrolytic capacitors can be unreliable over extended periods of time.

Figure 6:
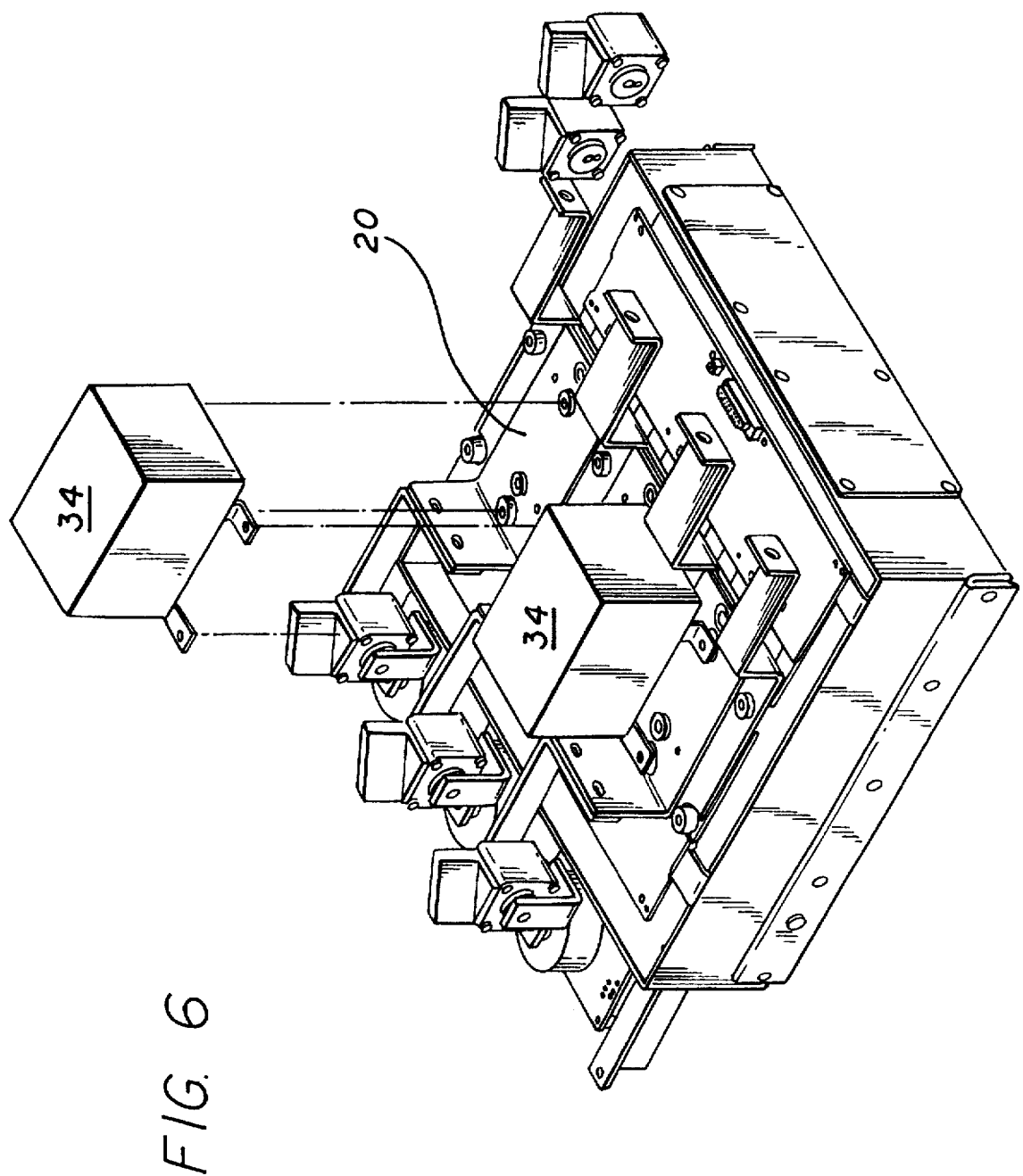
FIG. 6 shows an exploded perspective view of a preferred embodiment of a power inverter according to the present invention.

FIG. 6 shows an exploded perspective view of a preferred embodiment of a power inverter according to the present invention, in which these and other disadvantages of the prior art have been overcome. Comparing FIG. 6 with FIG. 3, it will be seen that the three snubber capacitors 22, the bank of ten electrolytic capacitors 24, and bus bars 26 and 28 have been replaced by a pair of boxes 34 that are bolted to the laminar bus bar assembly 20 overlaying the 3×2 matrix of IGBTs.

Figure 7:
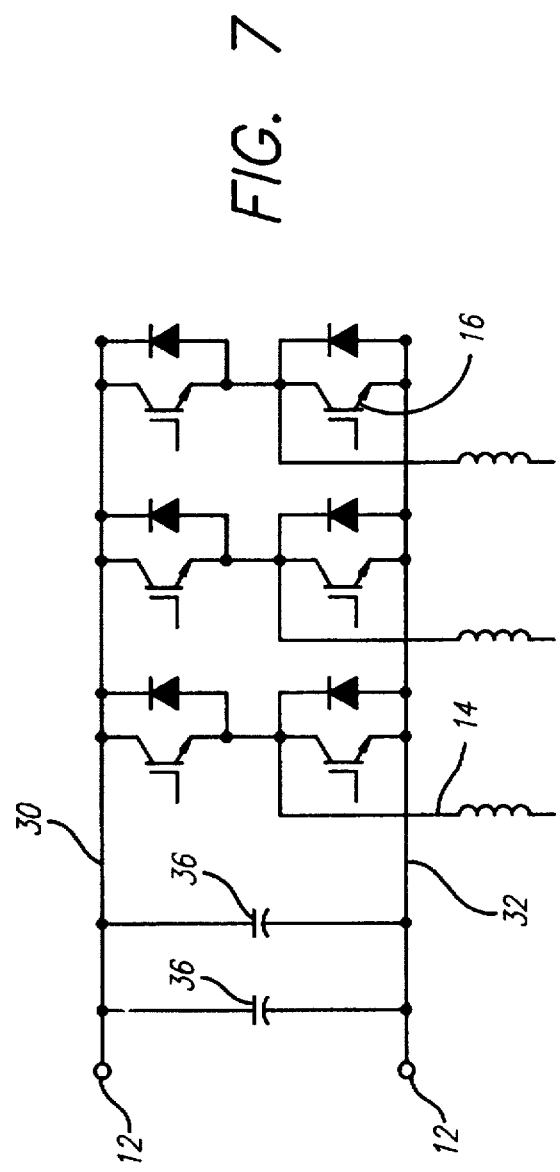
FIG. 7 shows a circuit diagram of a first preferred embodiment the inverter shown in FIG. 6.

FIG. 7 shows a circuit diagram of a first preferred embodiment of the inverter shown in FIG. 6. Each box 34 contains a high-current (preferably greater than 100 A ripple), high-microfarad (preferably greater than 1000 µF) film technology capacitor 36. These capacitors are preferably metallized film, extended foil capacitors, designed to optimize the film's intrinsic voltage capability. This results in an increased resonant point; high ripple current capability; reduced size; non-polarization; lower ESR and ESL (four orders of magnitude less than electrolytic capacitors); and longer life, due to the use of dry film capacitor construction as opposed to wet electrolytic, which eventually dries out. In the prototype of the present invention, a capacitance of 1150 µF was used. In the final design, the capacitance chosen was 1250 µF. The capacitors had a current capacity of 120 ripple amps per package.

In the FIG. 7 circuit, the bulk film capacitors 36 supply the ripple current that, in the prior art, was supplied by the bank of ten electrolytic capacitors. It will be appreciated that, although only two film capacitors are shown in FIG. 7, it would be within the spirit of the invention to use any number of film capacitors, depending upon the needs of the circuit.

Figure 8:
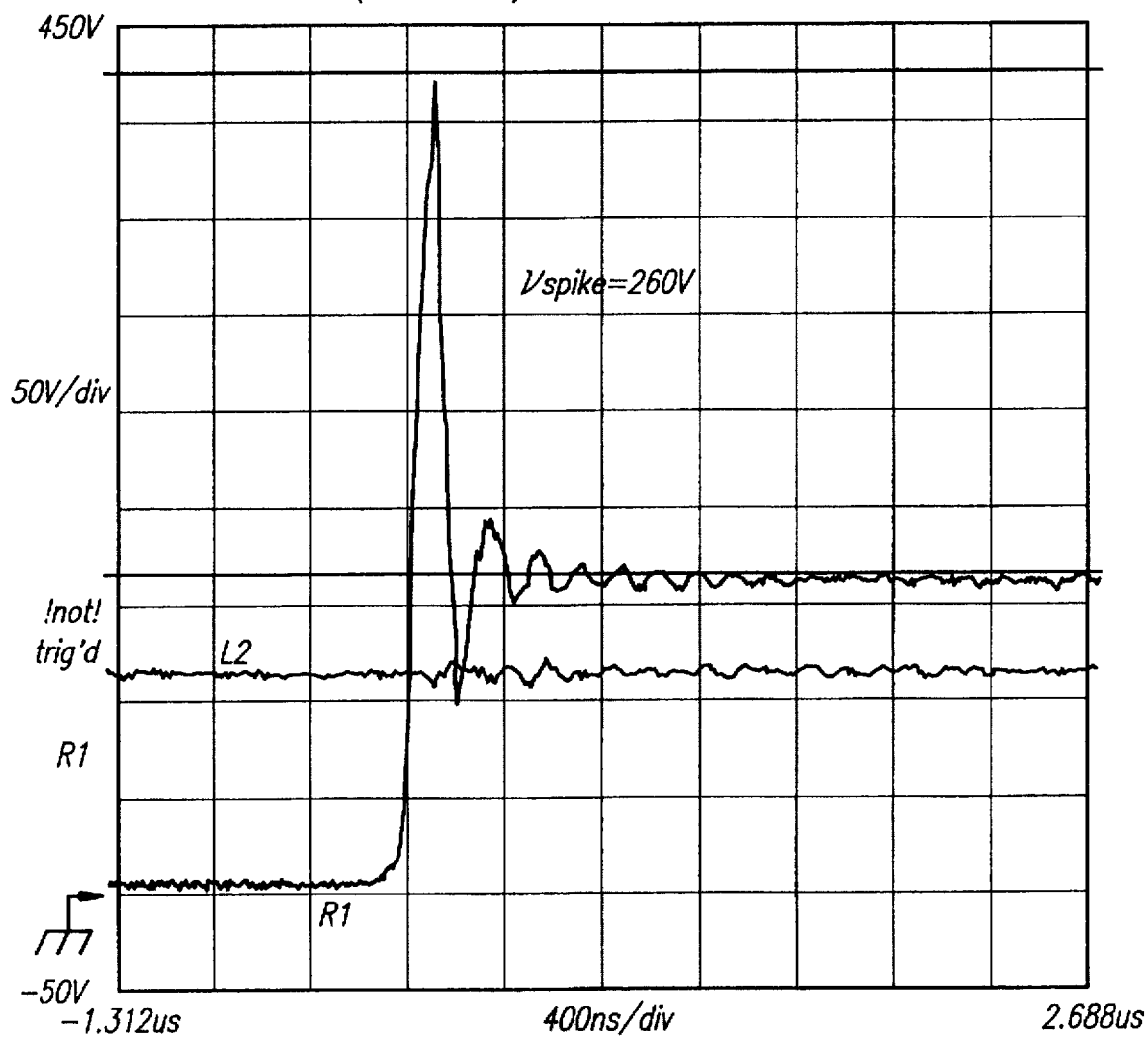
FIG. 8 shows an oscilloscope plot taken from the inverter shown in FIG. 7.

FIG. 8 shows an oscilloscope plot taken from the circuit shown in FIG. 7 under normal operating conditions. As can be seen in FIG. 8, the resulting waveform is similar to that shown in FIGS. 5A and 5B, although the voltage spike is now slightly higher. It follows from this similarity in waveforms that the inverter circuit shown in FIG. 7 can be used in many of the same applications as the prior art inverter. It will be appreciated that no separate snubber capacitor section is required, nor is any shown, in the FIG. 7 circuit. However, bus inductance must be kept to a minimum.

Thus, compared with the prior art, the embodiment of the present invention shown in FIGS. 6 and 7 saves cost, reduces inverter size, and reduces inverter complexity. It has been estimated that the present invention saves thirty minutes out of a three-hour assembly process, due to the number of parts that have been eliminated, and that there is a 25-percent space saving in the physical package. Further, as discussed above, film capacitors are much more reliable than electrolytic capacitors, as they do not dry out over time. Thus, the lifetime of the product is no longer determined by electrolytics used in the design, and it is no longer necessary to use more capacitors than required to supply the needed capacitance, in order to extend product life.

Prior to the present invention, it was not an option to use film capacitors as bulk capacitors in a power converter circuit because of the need both for large microfarads and for high current handling. Prior-art film capacitors available on the market are microfarad-deficient. Thus, if one were to attempt to meet the microfarad and ripple current requirements of a power converter circuit with prior art film capacitors, the size of the capacitors as well as their cost would be prohibitive.

As mentioned above, the oscilloscope plot shown in FIG. 8 shows a slightly higher initial turn-off spike above the DC bus voltage compared with the prior-art inverter waveforms shown in FIGS. 5A and 5B. Whether the slightly higher spike is a problem depends upon the maximum bus voltage and the operating range of the switching devices. If these devices are to be operated at a higher bus voltage, the higher spike may result in a very limited voltage margin.

Figure 9:
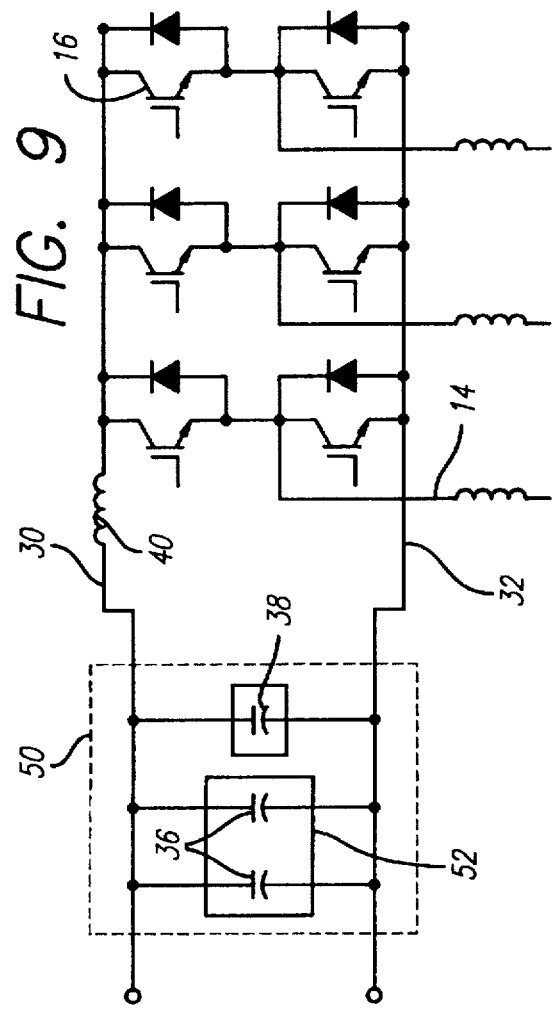
FIG. 9 shows a circuit diagram of a second preferred embodiment of the inverter shown in FIG. 6.

FIG. 9 shows a circuit diagram of a second preferred embodiment of the inverter shown in FIG. 6, in which this concern is addressed. The FIG. 9 circuit improves the turn-off spike characteristics of the high-microfarad film capacitors 36 by adding in close proximity to the bulk film capacitance a small (preferably less than 2 µF), high-frequency (i.e., lower impedance) film capacitor 38, connected in parallel with the bulk capacitance. High-frequency capacitor 38 is tuned based on the circuit's stray inductance 40, and on the device switching speed.

The method used to connect the high-frequency tuned capacitor 38 with the other components of the inverter circuit is crucial. The high-frequency capacitor 38 must be connected with minimal inductance to the switching transistors 16. This is accomplished through the use of extremely short, wide terminals made out of copper or other suitable material.

Low-inductance IGBT design requires the designer to space the IGBT devices as closely as possible. Thus, there is little room to separately place both bulk and high-frequency capacitors close enough to the IGBT terminals where they can function properly. One approach to connecting the high-frequency capacitor 38 into the inverter circuit is shown in FIG. 10A. The positive and negative DC buses 42, 44 that connect the bulk capacitance to the rest of the inverter circuit are arranged so that they are substantially parallel with each other, separated by a distance of 0.25 to 0.50 inches. Terminals 46 are provided for bolting the bus plates to the bulk capacitance. The high-frequency capacitor 38 is sandwiched between the DC buses 42, 44, and is mounted to terminals 46 by means of low-inductance, braided connectors 48.

Figure 10B:
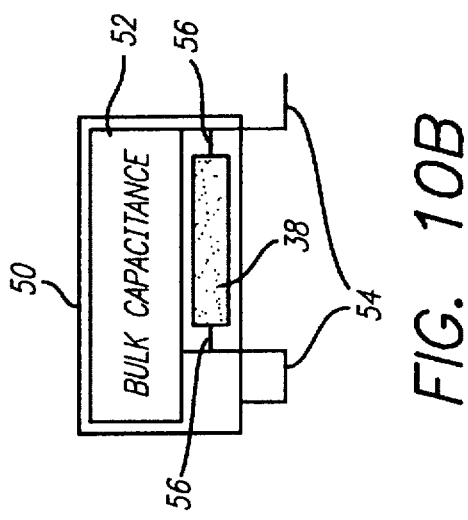
FIGS. 10A–C show alternative preferred embodiments of the capacitor section of the inverter circuit shown in FIG. 9.

However, for practicality, as shown in FIG. 10B, it is preferred that the high-frequency capacitor 38 be manufactured as an integral package 50 with the bulk film capacitance 52. The bulk capacitance 52 already has a pair of short, wide, low-inductance terminals 54, which are mounted directly onto the bus bars connecting the bulk capacitance 52 to the switching transistors. The high-frequency capacitor 38 has wide, low-inductance tab terminals 56, which are connected directly to the bulk capacitance terminals 54. Both capacitors are encased in the package 50. The terminals 54 of the high-current, high-microfarad bulk capacitance protrude from the package.

Figure 10C:
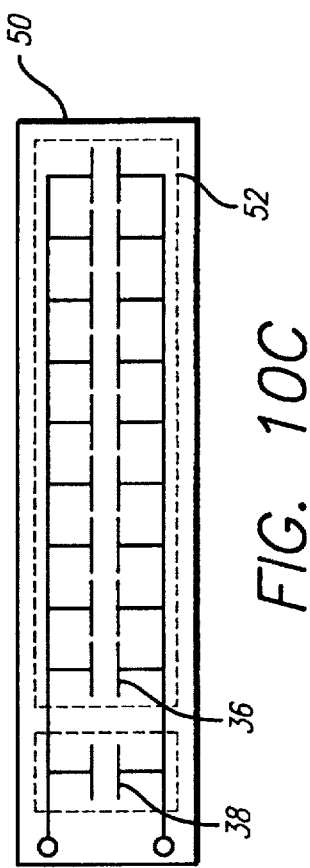
Figure 10A:
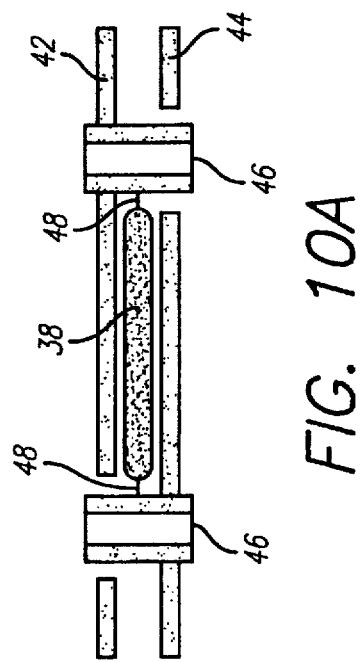

FIG. 10C shows a preferred embodiment of the capacitor arrangement shown in FIG. 10B. The high-frequency film capacitor 38 has a capacitance of 1–2 µF, and the bulk film capacitor section 52 comprises a bank of ten film capacitors (125 µF each). The number of bulk film capacitors chosen depends upon various design parameters; ten is not a general number.

Figure 11:
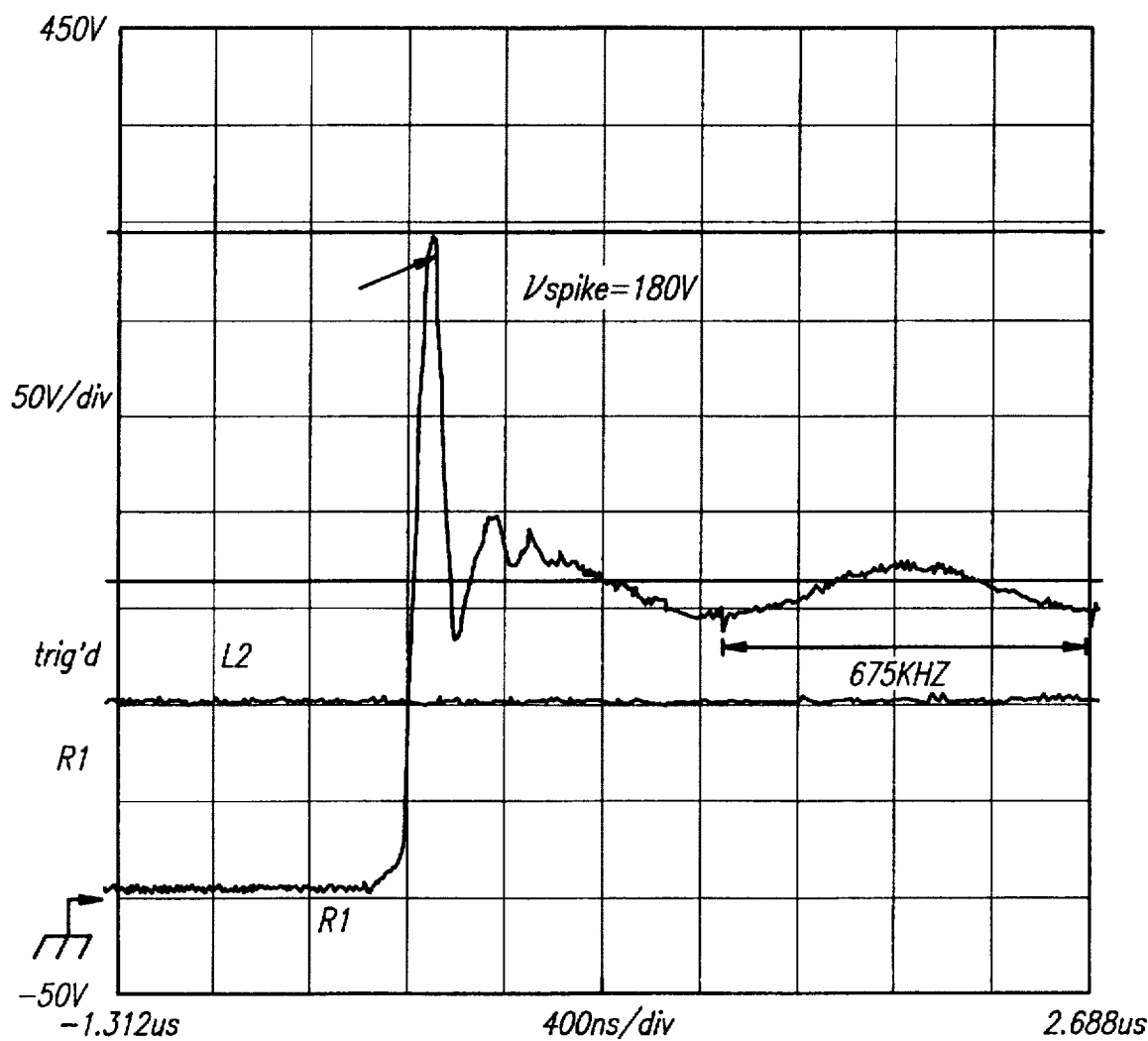
FIG. 11 shows an oscilloscope plot taken from the inverter circuit shown in FIG. 9.

FIG. 11 shows an oscilloscope plot taken from the inverter circuit shown in FIG. 9 under normal operating conditions. Comparing FIG. 11 with FIG. 8, it is apparent that a reduction of the spike voltage has been achieved. This reduction in spike voltage extends the operating range of the inverter circuit, which can be significant. For example, there is a significant cost penalty to going from a 600V IGBT to a 1200V IGBT. Thus, it is advantageous to be able to use 600V IGBTs across as high a DC bus voltage as possible.

Further, semiconductor switch manufacturers, such as Powerex, provide recommendations as to what types of snubber networks to use with their devices. With the 600V/ 0600 A IGBTs that are used in the present inverter circuit, the manufacturer's recommendation is to use a complex diode clamp snubber. A capacitor snubber is recommended for use only with lower current devices. The present invention extends the useful range of the capacitor snubber by incorporating the small-microfarad, high-frequency capacitor into the bulk film capacitor.

The present invention has wide application, inasmuch as inverters are used in many places where DC is changed to AC: motor drives, welders, power converters, etc. In many different types of equipment, the AC from a power supply line is rectified to DC, then an inverter is used to generate AC to run a motor. In addition, the DC filtering concept embodied in the present invention can be applied to DC/DC converters, AC/DC converters, single-phase inverters (i.e., an inverter with two switches), and H-bridge inverters (an inverter with four switches).

Thus, while the foregoing description includes detail which will enable those skilled in the art to practice the invention, it should be recognized that the description is illustrative in nature and that many modifications and variations will be apparent to those skilled in the art having the benefit of these teachings. It is accordingly intended that the invention herein be defined solely by the claims appended hereto and that the claims be interpreted as broadly as permitted in light of the prior art.

What is claimed is:

1. An integrally packaged bulk capacitance for use in a power converter circuit, comprising:

a bulk film capacitor section having a pair of low-inductance terminals; and a high-frequency film capacitor having a capacitance of less than 2 microfarads and having a pair of low-inductance terminals connected with minimal inductance to the terminals of the bulk film capacitor section, the high-frequency film capacitor being tuned based on stray capacitance in the power converter circuit and on the switching speed of the power converter circuit, the bulk film capacitor and the high-frequency film capacitor being manufactured as an integral package, the terminals of the bulk film capacitor protruding from the package, the integrally packaged bulk capacitance supplying the ripple amps and bulk filtering required by the power converter circuit, as well as protecting the power converter circuit from repetitive transient voltages arising during operation of the power converter circuit.

2. An integrally packaged bulk capacitance according to claim 1, wherein the high-frequency film capacitor has a capacitance of 1–2 microfarads.

3. An integrally packaged bulk capacitance according to claim 1, wherein the bulk capacitor section comprises a bank of capacitors.

4. An integrally packaged bulk capacitance according to claim 3, wherein the bulk capacitor section comprises a bank of ten capacitors, each of which having a capacitance of 125 microfarads.

* * * * *